(12) United States Patent
Higashino et al.

(10) Patent No.: US 8,730,776 B2
(45) Date of Patent: May 20, 2014

(54) RECORDING DEVICE AND STRAY LIGHT SIGNAL COMPONENT CANCELLATION METHOD

(71) Applicant: Sony Corporation, Tokyo (JP)

(72) Inventors: Satoru Higashino, Tokyo (JP); Junichi Horigome, Tokyo (JP); Mitsugu Imai, Kanagawa (JP); Yuuichi Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/779,989

(22) Filed: Feb. 28, 2013

(65) Prior Publication Data

US 2013/0250744 A1  Sep. 26, 2013

(30) Foreign Application Priority Data

Mar. 26, 2012  (JP) .................................. 2012-068843

(51) Int. Cl.
G11B 20/00 (2006.01)
(52) U.S. Cl.
USPC ......................................... 369/47.17

(58) Field of Classification Search
USPC ............................................ 369/47.15, 47.17
See application file for complete search history.

(56) References Cited

U.S. PATENT DOCUMENTS

| 6,714,495 B2 * | 3/2004 | Maeda ....................... 369/47.51 |
| 2003/0223330 A1 * | 12/2003 | Kuribayashi et al. ...... 369/47.17 |
| 2013/0223198 A1 * | 8/2013 | Ando et al. ................ 369/44.11 |

FOREIGN PATENT DOCUMENTS

| JP | 2005-332453 A | 12/2005 |
| JP | 2008-108325 A | 5/2008 |

* cited by examiner

*Primary Examiner* — Brenda Bernardi
(74) *Attorney, Agent, or Firm* — Wolf, Greenfield & Sacks, P.C.

(57) ABSTRACT

Provided is a recording device, including a light irradiation/receiving unit that irradiates an optical recording medium with first light and second light, and that receives backpropagating light of the second light from the optical recording medium, a recording unit that carries out recording on the optical recording medium, a playback signal generating unit that obtains a playback signal of a signal, and a stray light signal component canceling unit that generates, based on recording data, a stray light cancel signal for canceling a stray light signal component.

11 Claims, 8 Drawing Sheets

PRIOR ART

PRIOR ART

RECORDING DEVICE AND STRAY LIGHT SIGNAL COMPONENT CANCELLATION METHOD

BACKGROUND

The present technology relates to a recording device that carries out recording on an optical recoding medium, and particularly is suitably applied to a recording device in which first light that serves as recording light and second light that is different from the first light are applied and, as stray light associated with emission of the first light leaks into the second light when the second light is received, a stray light component is superimposed on a playback signal of the second light. Further, the present technology relates to a method for canceling a stray light signal component suitably applied to such a recording device.

As an optical recording medium on which recording or playback of a signal is carried out through light irradiation, a so-called optical disc recording medium (hereinafter, simply referred to as an optical disc in some cases) such as, for example, a CD (Compact Disc), a DVD (Digital Versatile Disc), and a BD (Blu-ray Disc: (R)) is widely available.

In a recording device that carries out recording on an optical disc, tracking servo control is carried out to cause a beam spot of irradiation light to follow a track formed on the optical disc.

To be more specific, a guide groove such as a pregroove is formed in advance in a typical recordable optical disc, and a tracking servo is carried out at the time of recording such that a recording spot follows the guide groove. Through this, recording can be carried out without a mark array intersecting with each other while eliminating an influence of the disc being eccentric or the like.

An optical disc in which a guide groove is not formed in a recording layer has been being developed in recent years. Not forming a guide groove in a recording layer leads to advantages such as reduction in the manufacturing costs to be incurred, for example, by multilayering.

Unlike a typical optical disc in which a guide groove is formed, the tracking servo may not be carried out on such an optical disc using recording light.

Thus, it is contemplated that recording on an optical disc in which a guide groove is not formed in the recording layer is carried out through a so-called ATS (Adjacent Track Servo).

The ATS was originally being considered for a self-servo track writer (SSTW) in a hard disc drive.

FIG. 7 is a descriptive view of the ATS.

As shown in FIG. 7, in the ATS, a recording spot Swr and an adjacent track servo spot Sats (hereinafter, abbreviated to an ATS spot) are formed on a recording layer. The spot Swr and the spot Sats are formed by irradiating a recording surface 100 of the recording layer with respective light beams therefor through a common objective lens 101, as shown in FIG. 8. Here, a distance between the spots is fixed at a predetermined length.

As shown in FIG. 7, in the ATS, provided that the recording spot Swr is a preceding spot (that is, an outer peripheral side in a case where a direction in which the recording progresses is from the inner periphery to the outer periphery) and the ATS spot Sats is a following spot, the tracking servo is carried out with the ATS spot Sats on a mark array that is formed by the recording spot Swr. That is, tracking servo control of the objective lens 101 is carried out such that the ATS spot Sats follows a track that is behind, by a single track, a track on which the recording spot Swr is formed.

To be more specific, such ATS can be realized by generating a tracking error signal based on reflection light from the ATS spot Sats and by driving a lens actuator 102 shown in FIG. 8 based on the tracking error signal to control the position of the objective lens 101.

Through such ATS, even when a guide groove is not formed in the recording layer, a signal can be recorded on the recording surface 100 at a pitch in accordance with spacing between the spot Swr and the spot Sats. (See, for example, Japanese Patent Laid-Open No. 2008-108325 and Japanese Patent Laid-Open No. 2005-332453.)

SUMMARY

Here, in a case where the ATS as described above is employed, recording information by the recording spot Swr can be read without the ATS spot Sats interrupting the recording. That is, a verify can be carried out without interrupting the recording.

However, in the ATS, since the ATS spot Sats is arranged in relatively close proximity to the recording spot Swr, it has been confirmed that a stray light component generated in accordance with light emission of the recording spot Swr (a reflection light component of the light emission) is received at a light receiving part of the ATS spot Sats. That is, a cross talk component in accordance with the light emission is superimposed on a playback signal by the ATS spot Sats.

Accordingly, it is desirable, as in a case of the above-described ATS, for example, when first light that serves as recording light and second light that is different from the first light are applied and, as stray light associated with emission of the first light leaks into the second light when the second light is received, a stray light signal component is superimposed on a playback signal of the second light, to be able to remove the stray light signal component.

According to a first embodiment of the present technology, there is provided a recording device, including a light irradiation/receiving unit that irradiates an optical recording medium with first light which serves as recording light and with second light which is different from the first light and that receives backpropagating light of the second light from the optical recording medium, a recording unit that carries out recording on the optical recording medium based on recording data by driving a light source of the first light to emit light, a playback signal generating unit that obtains a playback signal of a signal which is recorded on the optical recording medium based on a light receiving signal of the second light, and a stray light signal component canceling unit that generates, based on recording data, a stray light cancel signal for canceling a stray light signal component which is superimposed on the playback signal by stray light associated with emission of the first light leaking into the second light when the second light is received, and that cancels the stray light signal component to be superimposed on the playback signal through the stray light cancel signal.

Through the stated configuration, the stray light signal component that is associated with the emission of the first light and that is superimposed on the playback signal of the second light can be removed.

According to the embodiments of the present disclosure described above, as in a case of the ATS (adjacent track servo), for example, when the first light that serves as the recording light and the second light that is different from the first light are applied and, as the stray light associated with the emission of the first light leaks into the second light when the second light is received, the stray light signal component is superimposed on the playback signal of the second light, it is possible to remove the stray light signal component.

DETAILED DESCRIPTION OF THE EMBODIMENT(S)

Figure 1:
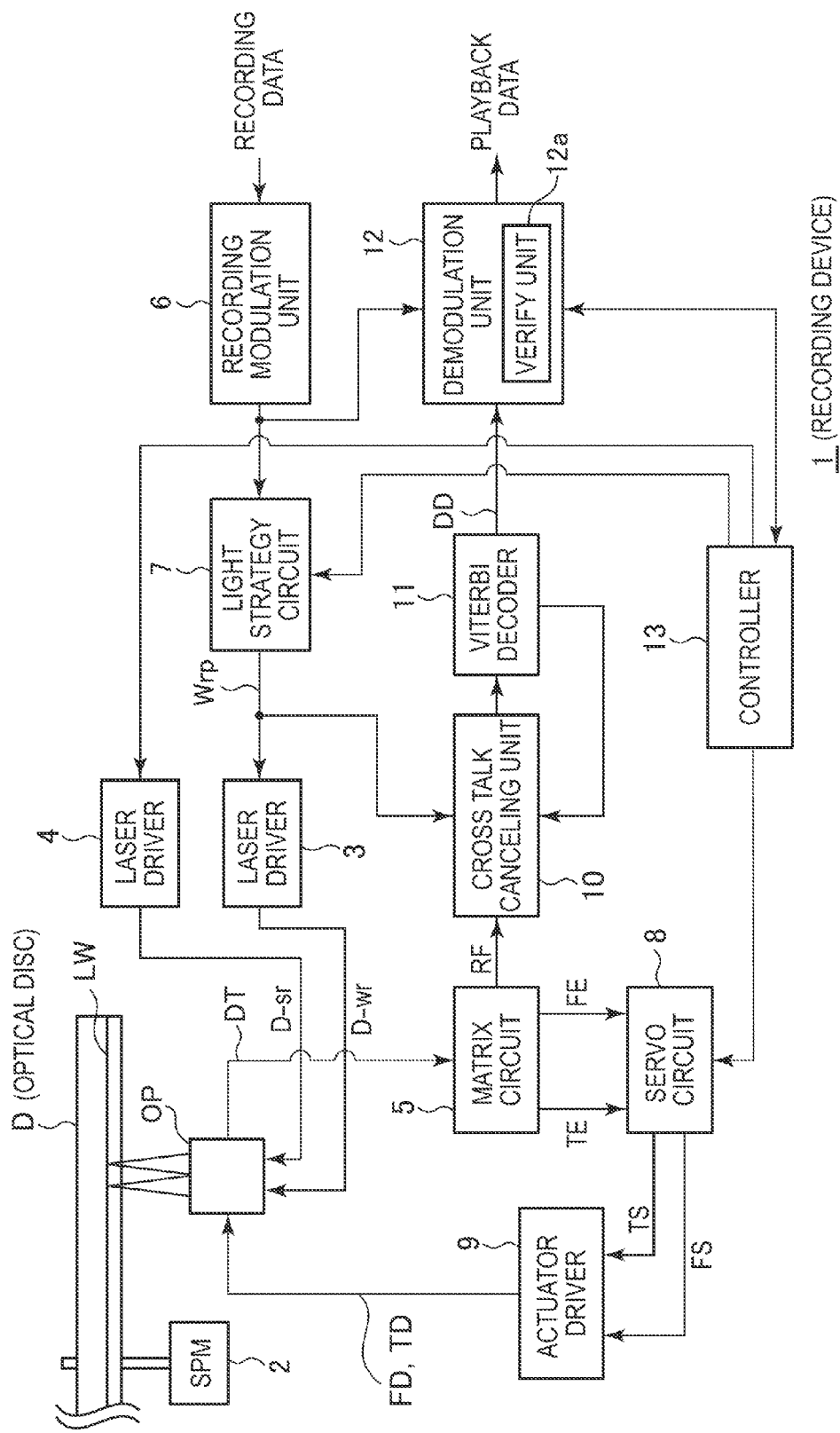
FIG. 1 is a block diagram showing an overall internal configuration of a recording device of an embodiment.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Hereinafter, embodiments according to the present technology will be described.

Note that the description will be given in the following order.

<1. First Embodiment>
[1-1. Overall Configuration of Recording Device]
[1-2. Internal Configuration of Cross Talk Canceling Unit]
<2. Second Embodiment>
<3. Experimental Result>
<4. Modifications>
<1. First Embodiment>
[1-1. Overall Configuration of Recording Device]

FIG. 1 is a block diagram showing an overall internal configuration of a recording device 1 serving as an embodiment of the present technology.

First, on optical disc D that serves as a disc-shaped optical recording medium is shown in FIG. 1. Note that an optical recording medium is a general term for a recording medium on which recording or playback is carried out through a signal by light irradiation.

Here, the optical disc D is a recordable optical disc on which a signal in accordance with light irradiation can be recorded on a recording layer LW thereof.

Further, in the present example, an assumption is that a region within which a guide groove is not formed is secured on at least a part of the recording layer LW of the optical disc D and the recording device 1 carries out recording on such region in which a guide groove is not formed.

The optical disc D that is loaded in the recording device 1 is placed on a turntable that is provided at a predetermined location of the recording device 1 and is rotationally driven by a spindle motor (SPM) 2 shown in the drawing through a predetermined rotation control method such as constant linear velocity (CLV).

As a configuration for irradiating, with light, the optical disc D that is rotationally driven as described above, an optical pickup OP shown in the drawing is provided.

Figure 2:
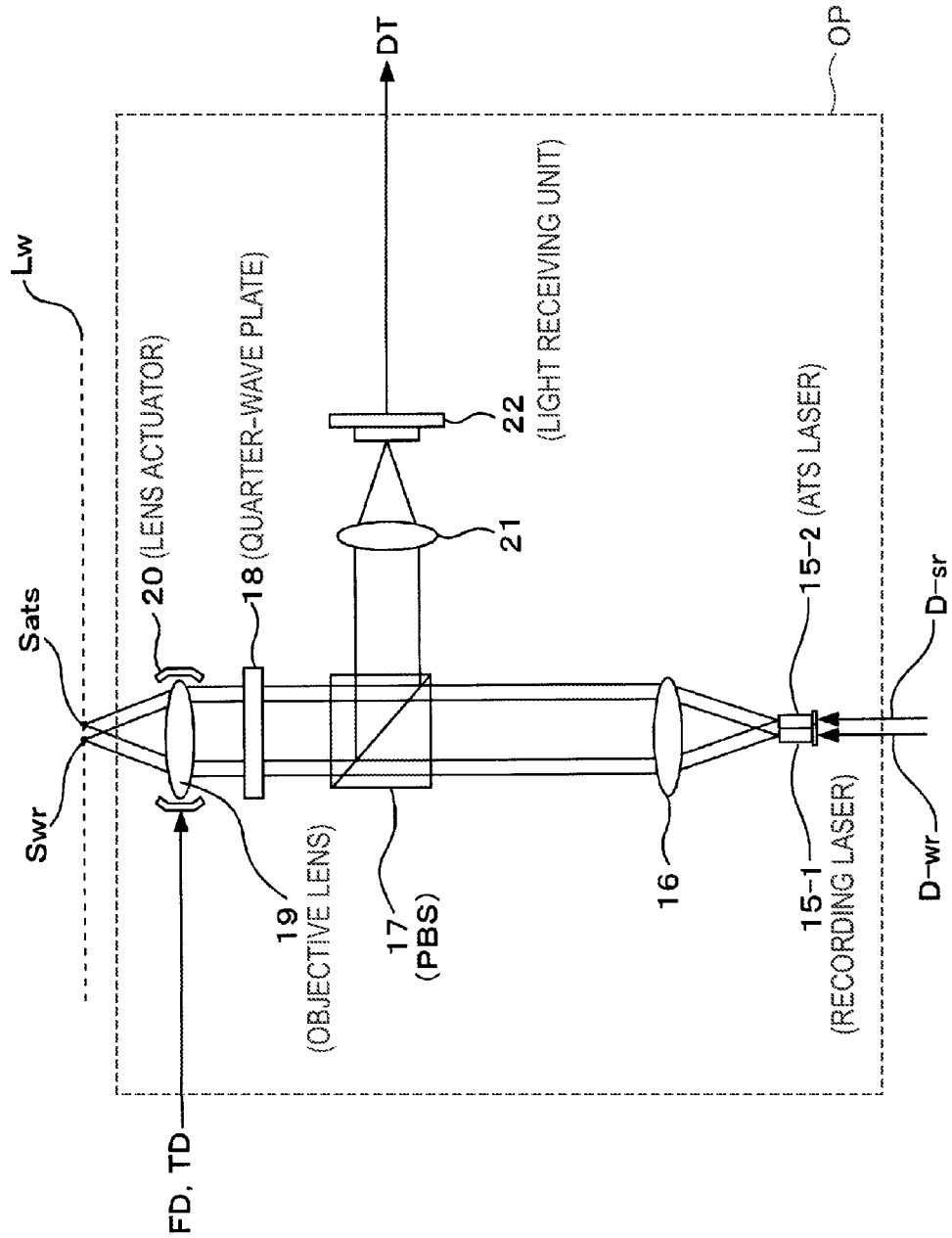
FIG. 2 is a diagram showing an internal configuration of an optical pickup that is included in a recording device of an embodiment.

Here, FIG. 2 shows an internal configuration of the optical pickup OP.

As shown in FIG. 2, a recording laser 15-1 and an ATS (Adjacent Track Servo) laser 15-2 are provided in the optical pickup OP.

In the present embodiment, the recording is carried out on the optical disc D through the ATS. The recording laser 15-1 serves as a light source of recording laser light for forming the recording spot Swr shown in FIG. 7 above, and the ATS laser 15-2 serves as a light source of ATS laser light for forming the ATS spot Sats.

The recording laser 15-1 is driven to emit light in accordance with a recording signal by a drive signal D-wr, which will be described later, and the ATS laser 15-2 is driven to emit light by a drive signal D-sr, which will be described later, so that a continuous light emitting operation can be achieved through regenerative power.

Figure 7:
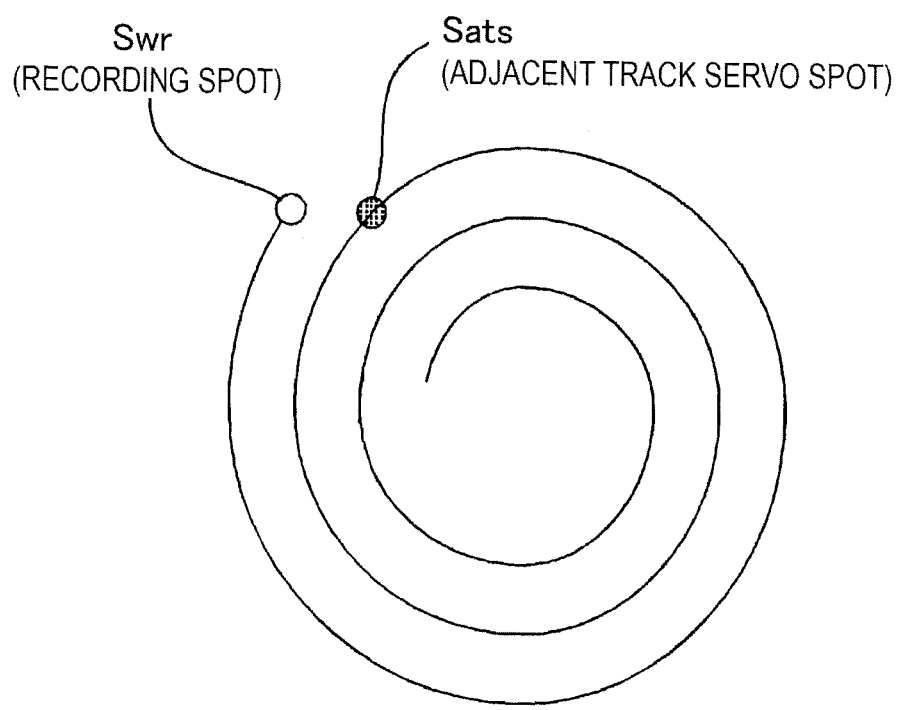
FIG. 7 is a descriptive view of an ATS.
Figure 8:
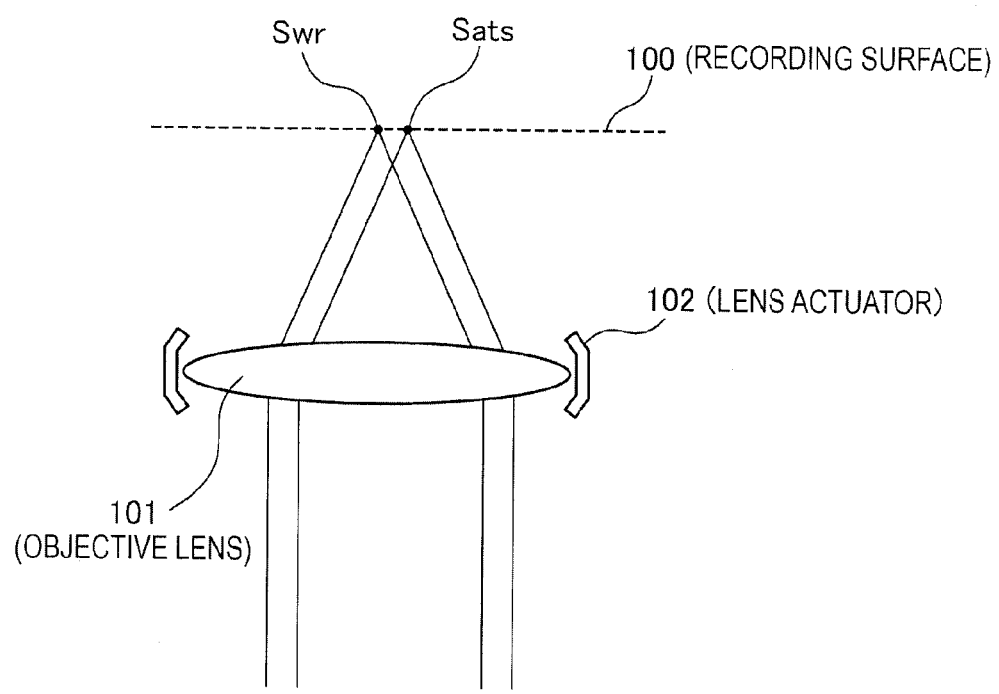
FIG. 8 is a descriptive view of a configuration of an optical system to realize the ATS.

Note that, as understood from the description on FIG. 7 above, the recording spot Swr serves as a preceding spot and the ATS spot Sats serves as a following spot in the ATS. Spacing between these spots S (spacing in a radial direction) is equivalent to a track pitch that is set in the recording layer LW. An optical system of such a case is configured to achieve such a positional relationship between the spots.

The recording laser light that is emitted from the recording laser 15-1 and the ATS laser light that is emitted from the ATS laser 15-2 are collimated through a collimator lens 16 and are then incident on a polarization beam splitter (PBS) 17.

The PBS 17 is configured to transmit the recording laser light and the ATS laser light that are incident thereon from a side of the light source.

The recording laser light and the ATS laser light that are transmitted through the PBS 17 pass through a quarter-wave plate 18 and are focused on the recording layer LW of the optical disc D through an objective lens 19 that is held by a lens actuator 20.

The lens actuator 20 holds the objective lens 19 such that the objective lens 19 can be displaced in a direction approaching to or being distanced from the optical disc D (a focus direction) and in a direction parallel to a radial direction of the optical disc D (a direction orthogonal to the focus direction: a tracking direction).

The lens actuator 20 includes a focus coil and a tracking coil, and as drive signals (drive signals FD and TD, which will be described later) are given respectively thereto, the lens actuator 20 displaces the objective lens 19 in the focus direction and in the tracking direction, respectively.

Here, as the recording layer LW is irradiated with the ATS laser light as described above, reflection light of the ATS laser light from the recording layer LW is obtained.

The reflection light of the ATS laser light obtained in this way passes through the objective lens 19 and is then incident on the PBS 17 through the quarter-wave plate 18.

The reflection light of the ATS laser light that is incident on the PBS 17 as such has a polarization direction thereof being rotated by 90 degrees between an incoming path and an outgoing path as the ATS laser light passes through the quarter-wave plate 18 twice along the incoming and outgoing paths. As a result, the reflection light of the ATS laser light that is incident on the PBS 17 as described above is reflected by the PBS 17.

The reflection light of the ATS laser light that is reflected by the PBS 17 is focused on the light receiving surface of a light receiving unit 22 through a converging lens 21.

Here, a light receiving signal that is obtained as the light receiving unit 22 receives the reflection light of the ATS laser light is referred to as a light receiving signal DT, hereinafter.

The light receiving unit 22 of the present example has a plurality of light receiving elements, and as the plurality of light receiving elements receives the reflection light of the ATS laser light, a plurality of light receiving signals can be obtained. The aforementioned light receiving signal DT encompasses the light receiving signals from the plurality of the light receiving elements.

The description will be brought back to FIG. 1.

The recording device 1 includes a laser driver 3 and a laser driver 4 as configurations for driving respectively the recording laser 15-1 and the ATS laser 15-2 that are provided in the optical pickup OP to emit light.

The laser driver 4 generates, based on an instruction from a controller 13, which will be described later, a drive signal D-sr for driving the ATS laser 15-2 to continuously emit light through regenerative power and drives the ATS laser 15-2 to emit light through the drive signal D-sr.

Further, the laser driver 3 generates a drive signal D-wr for causing a light emitting operation based on recording data.

Here, a recording modulation unit 6 shown in the drawing is inputted with the recording data and obtains, by adding an error correction code to the recording data, or carrying out predetermined recording modulation coding processing or the like, a recording modulation code array that is a binary data array of [0] and [1] to be actually recorded on the recording layer LW.

The binary data array (the recording modulation code array) that is obtained in the recording modulation unit 6 is inputted to a light strategy circuit 7.

Further, in the present example, the aforementioned recording modulation code array is also supplied to a verify unit 12a in a demodulation unit 12, which will be described later.

The light strategy circuit 7 generates a recording pulse that is based on the aforementioned recording modulation code array in accordance with an instruction from the controller 13 and outputs the result as a recording signal Wrp.

The recording signal Wrp is supplied to the laser driver 3.

Note that, in the present example, the recording signal Wrp is also supplied to a cross talk canceling unit 10, which will be described later.

The laser driver 3 generates the drive signal D-wr that is based on the recording signal Wrp that is inputted from the light strategy circuit 7 and drives the recording laser 15-1 to emit light based on the drive signal D-wr. Through this, a mark array in accordance with the recording data is recorded on the recording layer LW.

The light receiving signal DT that is obtained in the optical pickup OP is supplied to a matrix circuit 5.

The matrix circuit 5 generates an RF signal (a playback signal), a focus error signal FE, and a tracking error signal TE based on the light receiving signal DT (output current) from the plurality of light receiving elements that serves as the light receiving unit 22 shown in FIG. 2.

The focus error signal FE is a signal that indicates an error in a focus of the ATS laser light with respect to the recording layer LW. Further, the tracking error signal TE is a signal that indicates an error in a position of the spot of the ATS laser light, in the radial direction thereof, with respect to a track (mark array) that is formed on the recording layer LW.

The RF signal obtained in the matrix circuit 5 is supplied to the cross talk canceling unit 10, and the focus error signal FE and the tracking error signal TE are both supplied to a servo circuit 8.

The servo circuit 8 carries out servo arithmetic processing on the focus error signal FE and the tracking error signal TE to respectively generate a focus servo signal FS and a tracking servo signal TS.

An actuator driver 9 generates a focus drive signal FD and a tracking drive signal TD that are based respectively on the focus servo signal FS and the tracking servo signal TS that are generated in the servo circuit 8 and drives the focus coil and the tracking coil, respectively, of the lens actuator 20 through the focus drive signal FD and the tracking drive signal TD.

Through this, focus servo control (servo control for causing the ATS spot Sats and the recording spot Swr to coincide with each other on the recording layer LW to be recorded on) and tracking servo control (servo control for causing the ATS spot Sats to follow a track on the recording layer LW to be recorded on) of the objective lens 19 are realized.

Note that the servo circuit 8 is configured to turn off the tracking servo to output a desired jump pulse in accordance with an instruction from the controller 13, to thereby be able to realize a so-called track jump operation.

Further, although not shown in the drawing, the recording device 1 actually includes a slide driving unit for slidingly moving the optical pickup OP as a whole in a direction parallel to a radial direction of the disc, and the servo circuit 8 controls driving of the slide driving unit in accordance with an instruction from the controller 13, to thereby slidingly move the optical pickup OP as a whole.

The RF signal obtained in the matrix circuit 5 is inputted to a Viterbi decoder 11 through the cross talk canceling unit 10.

Here, in the present example, a PRML (Partial Response Maximum Likelihood) decoding method is employed as a method for binarizing the RF signal.

An equalization filter (an equalizer 40, which will be described later) is provided in the cross talk canceling unit 10 to carry out PR equalization processing on the RF signal in accordance with a class of an employed PR (for example, PR(1,2,2,2,1) or the like). The RF signal on which such PR equalization processing has been carried out is inputted to the Viterbi decoder 11.

The cross talk canceling unit 10 is configured to carry out processing to cancel a stray light signal component (a cross talk component) that is in accordance with light emission of the recording spot Swr and that is superimposed on the RF signal in a case where the ATS is employed as in the present example, which will again be described later.

The Viterbi decoder 11 carries out maximum likelihood decoding processing based on the RF signal on which the PR equalization processing has been carried out as described above and obtains a binary data array DD in which the above-described recoding modulation code array is reproduced.

The binary data array DD is supplied to the demodulation unit 12.

Note that, in the present example, information on a maximum likelihood pass that is obtained through a process in the aforementioned maximum likelihood processing by the Viterbi decoder 11 is supplied to the cross talk canceling unit 10, which will be described later.

The demodulation unit 12 carries out predetermined demodulation processing such as decoding of the recoding modulation code or error correction processing on the binary data array DD, to thereby obtain reproduced data in which the aforementioned recording data is restored (reproduced).

Further, in the present example, the verify unit 12a is provided in the demodulation unit 12. The verify unit 12a carries out verify processing based on the binary data array DD and the recording modulation code from the recording modulation unit 6. A result of the verify by the verify unit 12a is supplied to the controller 13.

The controller 13 is configured of a microcomputer that includes, for example, a CPU (Central Processing Unit) and a memory (a storage device) such as a ROM (Read Only Memory) and a RAM (Random Access Memory) and carries out control/processing in accordance with a program that is stored, for example, in the aforementioned ROM or the like, to thereby carry out overall control of the recording device 1.

For example, the controller 13 instructs the servo circuit 8 to carry out seek operation control for moving the position of the ATS spot Sats to a desired position on the recording layer LW.

Further, the controller 13 instructs the laser driver 4 to cause the ATS laser 15-2 to continuously emit light through regenerative power.

Note that, in order to start recording by the ATS, a recorded track on which the ATS spot Sats carries out the tracking servo (a guide track for the ATS) may desirably be formed.

Such a guide track can be formed in advance, for example, at an innermost peripheral part of a disc (that is, provided as an optical disc product on which such a guide track is formed in advance). That is, in that case, the recording device 1 carries out the tracking servo by the ATS spot Sats on a part that is behind, by a single round or more, an end of the guide track that is formed in advance. Thereafter, recording by the recording spot Swr is started in response to that the ATS spot Sats has reached a position that is behind the end of the aforementioned guide track by a single round, whereby the recording by the ATS can be started.

Alternatively, the recording device 1 itself can form a guide track. That is, in that case, when recording is to be started, the recording device 1 forms a guide track for at least one round or more by the recording spot Swr while moving the objective lens 19 in a direction in which the recording progresses (for example, at the outer peripheral side in a case where the recording progresses from the inner periphery to the outer periphery). Thereafter, the tracking servo by the ATS spot Sats is carried out on a part that is behind, by a single round or more, the end of the guide track formed as such, and the recording by the recording sport Swr is started in response to that the ATS spot Sats has reached a position that is behind the end of the guide track by a single round. Through this, the recording by the ATS can be started.

Such control can be realized by the controller 13 instructing the servo circuit 8.

[1-2. Internal Configuration of Cross Talk Canceling Unit]

Figure 3:
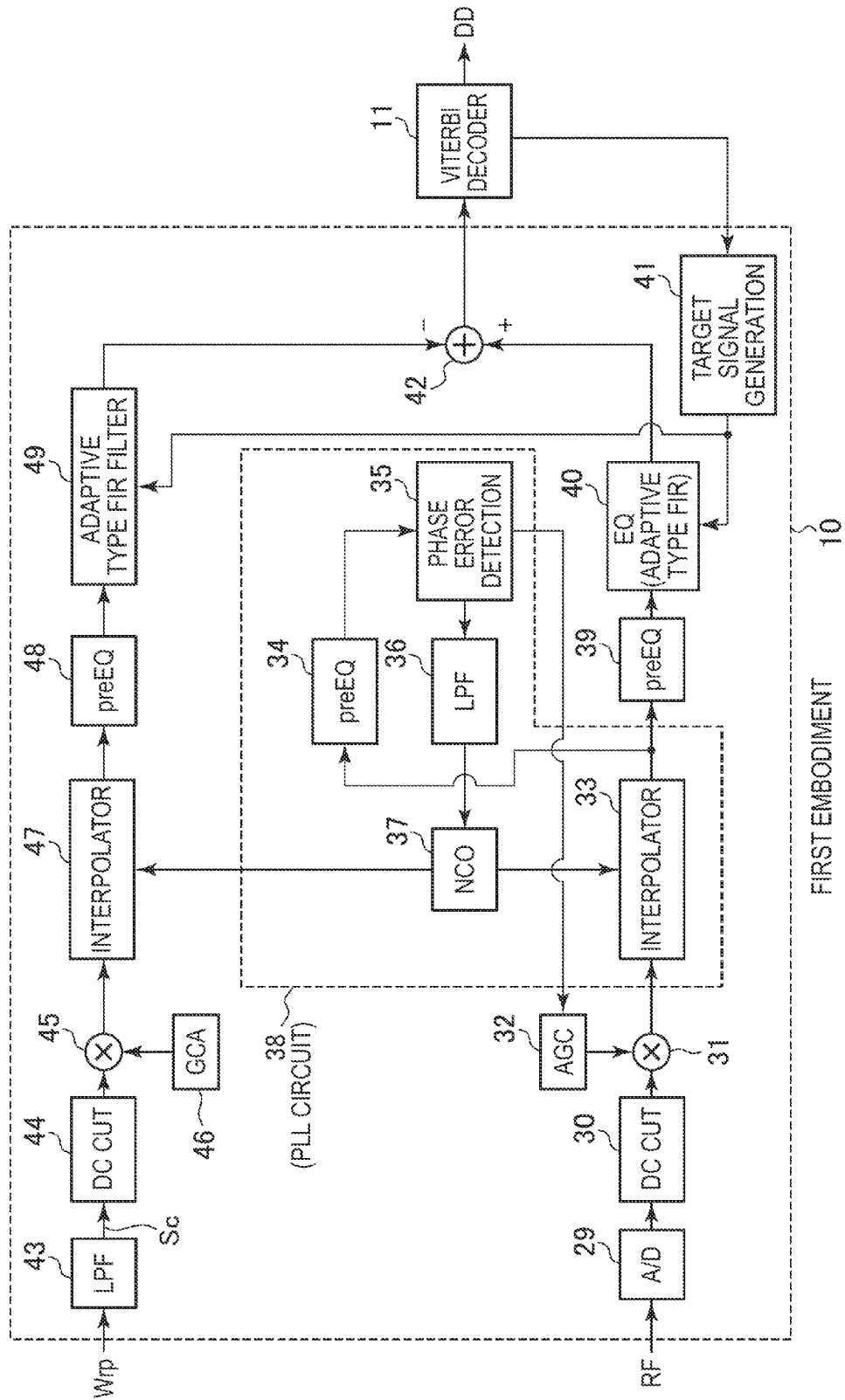
FIG. 3 is a block diagram showing an internal configuration of a cross talk canceling unit that is included in a recording device of a first embodiment.

FIG. 3 is a block diagram showing an internal configuration of the cross talk canceling unit 10 shown in FIG. 1.

Note that, in addition to the internal configuration of the cross talk canceling unit 10, the Viterbi decoder 11 shown in FIG. 1 is shown in FIG. 3 as well.

In the cross talk canceling unit 10, the RF signal from the matrix circuit 5 shown in FIG. 1 is digitally sampled in an A/D converter 29 and is inputted to a multiplier 31 after a DC component therein is removed in a DC cut unit 30.

The RF signal that has been inputted to the multiplier 31 has a gain thereof controlled through an AGC (Auto Gain Control) circuit 32 shown in the drawing. Note that the AGC circuit 32 carried out gain control based on an output of a phase error detection unit 35, which will be described later.

The RF signal that has passed through the multiplier 31 is inputted to an interpolator 33.

Here, in the present example, as a PLL (Phase Locked Loop) circuit for carrying out timing synchronization of the RF signal with a channel clock, a PLL circuit 38 of an ITR (Interpolated Timing Recovery) method that includes the aforementioned interpolator 33 is provided.

Note that, for the sake of convenience, the PLL circuit 38 of the ITR method will again be described later.

The RF signal that has passed through the interpolator 33 is synchronized in timing with the channel clock through an action of the PLL circuit 38, which will be described later, and inputted to a pre-equalizer (preEQ) 39 shown in the drawing.

The pre-equalizer 39 is configured, for example, of an FIR (Finite Impulse Response) filter and carries out high-frequency emphasis type equalization processing (for example, boosting 2T and 3T signals) on the RF signal.

The RF signal on which the equalization processing (boost processing) has been carried out by the pre-equalizer 39 is inputted to the equalizer 40 that serves as a PR equalizer.

Here, in the present example, the equalizer 40 is configured of an adaptive equalization type FIR filter and carries out adaptive type PR equalization processing in accordance with a result of decoding by the Viterbi decoder 11.

To be more specific, information on the maximum likelihood pass that is obtained in the Viterbi decoder 11 is inputted to a target signal generating unit 41 that is provided in the cross talk canceling unit 10. The target signal generating unit 41 carries out weighing addition processing on the aforementioned maximum likelihood pass to provide an intersymbol interference that is assumed for a class of an employed PR (for example, PR(1,2,2,2,1) in the present example) and generates an equalization target signal. To be more specific, the target signal generating unit 41 carries out weighing addition processing on the maximum likelihood pass in accordance with a PR characteristic coefficient such as the aforementioned PR(1,2,2,2,1) to provide the aforementioned intersymbol interference. Then, the result thereof is outputted to the equalizer 40.

The equalizer 40 is inputted with the equalization target signal that is generated by the target signal generating unit 41 based on the maximum likelihood pass and calculates an equalization error based on the target signal. Then, based on the equalization error, a tap coefficient is updated through, for example, an LMS (Least Mean Square) algorithm, and the adaptive type PR equalization processing is carried out on the RF signal.

The RF signal on which the PR equalization processing has been carried out by the equalizer 40 is inputted to the Viterbi decoder 11 after a subtraction with an output signal of an adaptive type FIR filter 49, which will be described later, is carried out in a subtractor 42 shown in the drawing.

Here, the PLL circuit 38 of the ITR method will be described.

As publicly known, the ITR method is a method in which timing synchronization is carried out so that a sampling value at an original sampling timing can be obtained by interpolating a waveform of an RF signal by an interpolator.

As shown in the drawing, the PLL circuit 38 in this case includes the interpolator 33, a pre-equalizer 34, a phase error detection unit 35, an LPF (low pass filter) 36, and an NCO (Number Control Oscillator) 37.

The RF signal that has passed through the interpolator 33 is inputted to the phase error detection unit 35 through the pre-equalizer 34.

Note that, as in the pre-equalizer 39 described above, the pre-equalizer 34 carries out high-frequency type equalization processing (high-frequency boost processing) on the RF signal and is configured, for example, of an FIR filter.

The phase error detection unit 35 calculates a phase error between a current phase and a predetermined target phase (the original sampling timing) based on the RF signal that has passed through the pre-equalizer 34.

Then, a phase error signal that is obtained in the phase error detection unit 35 is inputted to the LPF 36 that serves as a loop filter to have a low frequency component thereof extracted. Through this, a frequency control signal (a phase control signal) for compensating to obtain the original sampling timing is obtained.

The phase control signal that has been calculated in the LPF 36 is inputted to the NCO 37. The NCO 37 varies a phase of a clock signal which the NCO 37 itself outputs based on an inputted phase control signal.

The interpolator 33 carries out waveform interpolation processing on the RF signal based on the clock signal that is inputted from the NCO 37. Through this, timing synchronization is achieved such that an RF signal sampling value at the original sampling timing is obtained.

Note that a principle with which the timing synchronization is achieved through the ITR method is described, for example, in Japanese Patent Laid-Open No. 2005-108295.

In addition to the configurations for the PR equalization and the timing synchronization of the RF signal as described above, a configuration for canceling, based on the recording signal Wrp, a stray light signal component to be superimposed on the RF signal is provided in the cross talk canceling unit 10 as well.

To be more specific, an LPF 43, a DC cut unit 44, a multiplier 45, a GCA (Gain Control Amplifier) 46, an interpolator 47, a pre-equalizer 48, the adaptive type FIR filter 49, and the subtractor 42 shown in the drawing are provided.

As shown in the drawing, the recording signal Wrp is inputted to the LPF 43. Note that, in the present example, the recording signal Wrp that is outputted from the light strategy circuit 7 is a digital signal.

The LPF 43 extracts a low frequency component of the recording signal Wrp (that is, the LPF 43 transmits mid to high frequency component thereof).

Figure 4:
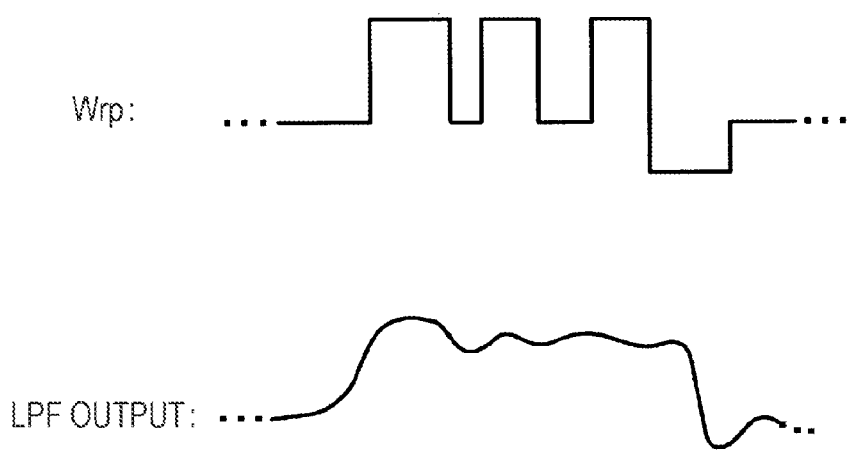
FIG. 4 is a diagram for describing an action by an LPF to be used to generate a stray light canceling signal.

FIG. 4 is a diagram for describing an action by the LPF 43 and, in particular, shows, in comparison, a waveform of the recording signal Wrp prior to being inputted to the LPF 43 (Wrp in the drawing) and the recording signal Wrp to be outputted from the LPF 43 (LPF output in the drawing).

As shown in the drawing, the recording signal Wrp that serves as a recording pulse is smoothed by passing through the LPF 43, and a stray light signal component to be superimposed on the RF signal can be reproduced in a pseudo manner.

Note that, as understood from this point, a cutoff frequency of the LPF 43 is desirably set such that a stray light signal component to be superimposed on the RF signal is appropriately reproduced from the signal Wrp that serves as a recording pulse.

In FIG. 3, the recording signal Wrp that has passed through the LPF 43 is referred to as a signal Sc as shown in the drawing.

The signal Sc is inputted to the multiplier 45 after having a DC component thereof removed by the DC cut unit 44. The signal Sc that has been inputted to the multiplier 45 has a gain thereof controlled through the GCA 46.

The signal Sc that has passed through the multiplier 45 is inputted to the interpolator 47.

The interpolator 47 carries out waveform interpolation processing on the signal Sc based on the phase control signal from the NCO 37 described above. Through this, timing synchronization of the signal Sc with the RF signal is achieved.

The signal Sc that has passed through the interpolator 47 is inputted to the adaptive type FIR filter 49 after being subjected to equalization processing by the pre-equalizer 48.

Here, the pre-equalizer 48 is provided to correspond to the pre-equalizer 39 that carries out the boost processing on the RF signal and to carry out similar boost processing on the signal Sc as well. That is, the pre-equalizer 48 carries out high-frequency type equalization processing on the signal Sc similarly to the pre-equalizer 39 described above.

The pre-equalizer 48 is also configured, for example, of an FIR filter.

Further, the adaptive type FIR filter 49 is provided to correspond to the equalizer 40 that carries out the adaptive type PR equalization processing on the RF signal and to carry out similar adaptive type PR equalization processing on the signal Sc as well.

As shown in the drawing, the equalization target signal that is generated by the above-described target signal generating unit 41 based on the maximum likelihood pass signal is inputted to the adaptive type FIR filter 49. The adaptive type FIR filter 49 carries out a tap coefficient update processing based on the target signal to carry out the adaptive type PR equalization processing on the signal Sc similarly to the equalizer 40 described above. Note that, the update of the tap coefficient is carried out through the LMS algorithm in this case as well.

The signal Sc on which the PR equalization processing has been carried out by the adaptive type FIR filter 49 is inputted to the subtractor 42.

The subtractor 42 subtracts the signal Sc on which the PR equalization has been carried out by the adaptive type FIR filter 49 from the RF signal inputted from the equalizer 40 on which the PR equalization has been carried out.

Through this, a stray light signal component that is in accordance with the light emission of the recording spot Swr and that is superimposed on the RF signal is removed.

The RF signal from which a stray light signal component is removed in this way is inputted to the Viterbi decoder 11.

As described above, in the present embodiment, in a case where the ATS is employed and where the first light that serves as the recording light and the second light that is different from the first light are applied and, as stray light associated with the emission of the first light leaks into the second light when the second light is received, a stray light signal component is superimposed on a playback signal of the second light, the stray light signal component can be removed.

Accordingly, for example, in a case where a verify of the recording signal is carried out by the recording light based on a playback signal of the second light as in the present embodiment, the precision thereof can be improved.

<2. Second Embodiment>

Here, although cancellation of a stray light signal component is carried out only on the RF signal that is supplied to the Viterbi decoder 11 in the first embodiment, cancellation of a stray light signal component is also carried out on an RF signal that is inputted to a PLL circuit in a second embodiment.

Figure 5:
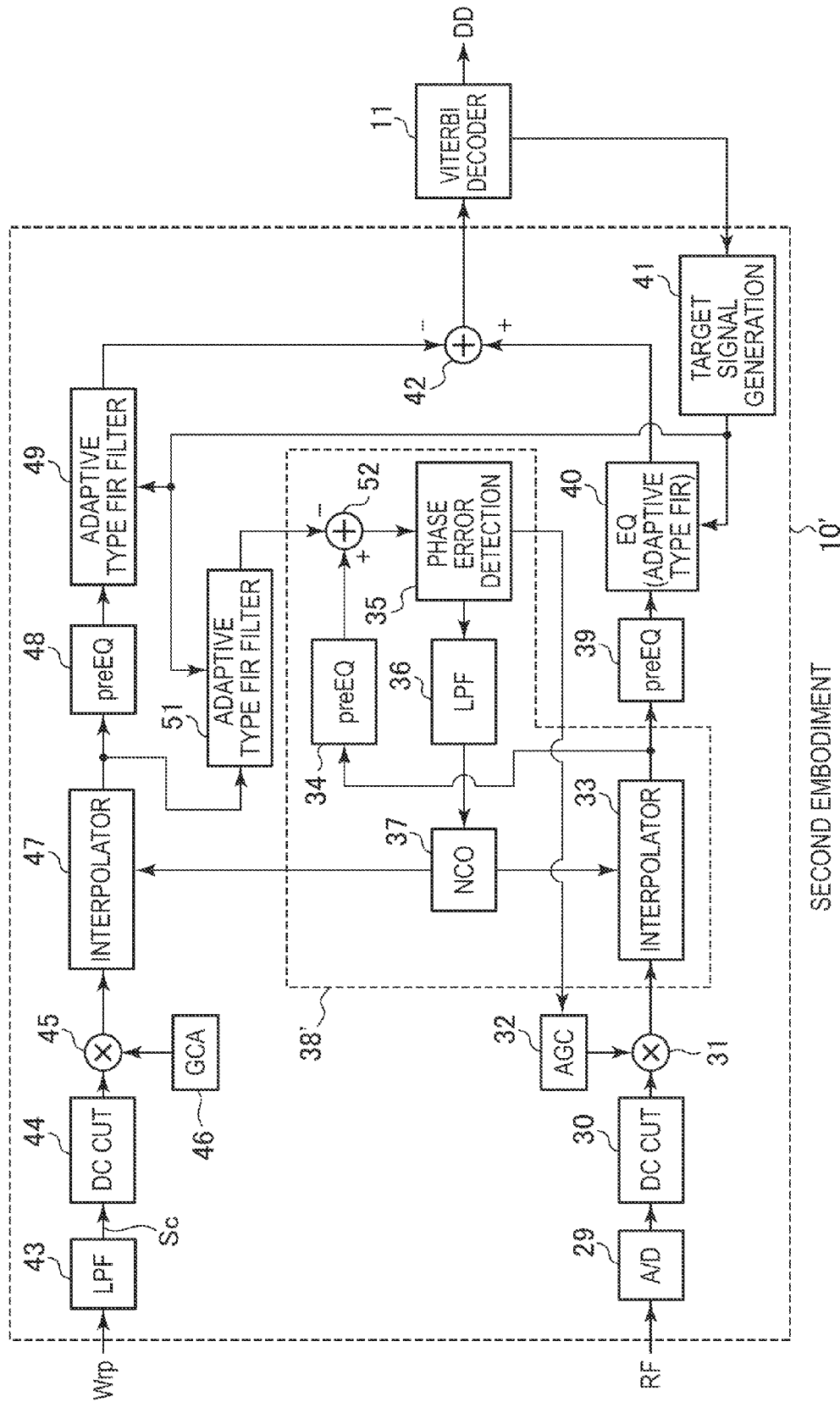
FIG. 5 is a block diagram showing an internal configuration of a cross talk canceling unit that is included in a recording device of a second embodiment.

FIG. 5 is a block diagram showing an internal configuration of a cross talk canceling unit 10' that is included in a recording device of the second embodiment.

Note that, since the overall configuration of the recording device is similar to that in the first embodiment described above, duplicate description thereof with reference to the drawings will be omitted.

Further, in the description to follow, portions similar to those that have already been described will be given the identical reference characters, and the description thereof will be omitted.

In FIG. 5, the cross talk canceling unit 10' of the second embodiment differs from the cross talk canceling unit 10 of the first embodiment in that an adaptive type FIR filter 51 is added and a PLL circuit 38' is provided in place of the PLL circuit 38.

The PLL circuit 38' is configured by adding a subtractor 52 to the PLL circuit 38.

As shown in the drawing, the signal Sc that is outputted from the interpolator 47 to the pre-equalizer 48 is split and inputted to the adaptive type FIR filter 51.

An equalization target signal that is generated by the target signal generating unit 41 based on the maximum likelihood pass signal is inputted to the adaptive type FIR filter 51. The adaptive type FIR filter 51 carries out tap coefficient update processing based on the target signal to carry out adaptive type equalization processing on the signal Sc. Note that the update of the tap coefficient is carried out through the LMS algorithm in this case as well.

The signal Sc on which the equalization processing has been carried out by the adaptive type FIR filter 51 is inputted to the subtractor 52 that is provided in the PLL circuit 38'.

As shown in the drawing, in addition to the signal Sc on which the equalization processing has been carried out by the adaptive type FIR filter 51, the RF signal on which the boost processing has been carried out by the pre-equalizer 34 is inputted to the subtractor 52 as well.

The subtractor 52 subtracts the signal Sc on which the equalization processing has been carried out by the adaptive type FIR filter 51 from the RF signal on which the boost processing has been carried out by the pre-equalizer 34.

Through this, as for the aforementioned RF signal to be inputted to the PLL circuit, a stray light signal component to be superimposed thereon can be removed.

In this way, the RF signal from which the stray light signal component has been removed is inputted to the phase error detection unit 35 as shown in the drawing.

In this way, by carrying out processing to cancel the stray light signal component of the RF signal to be inputted to the PLL circuit, timing synchronization of the RF signal and the signal Sc can be achieved with higher accuracy, and playback performance can be further improved.

<3. Experimental Result>

Figure 6:
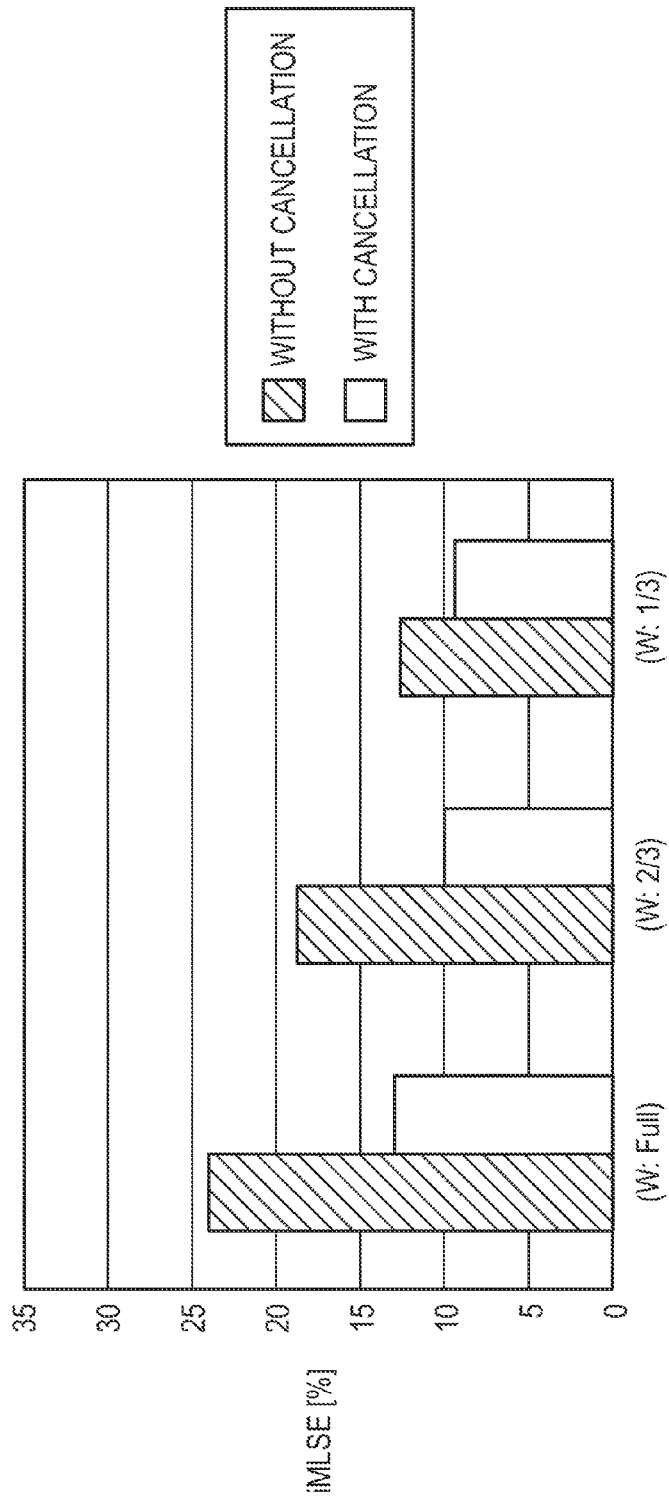
FIG. 6 is a diagram showing a result of an experiment to verify the effectiveness of a method for canceling a stray light signal component of an embodiment.

FIG. 6 is shows a result of an experiment to verify the effectiveness of a method for canceling a stray light signal component of an embodiment.

To be more specific, FIG. 6 shows, in a bar graph, a result of measuring iMLSE that was obtained respectively in cases where light emission intensity (W) was set to Full (for example, 3 mW), to ⅔ thereof (W: ⅔), and to ⅓ (W: ⅓). Bars in solid black show a measurement result in a case where the stray light signal component was not canceled, and bars in solid white show a measurement result in a case where the stray light signal component was canceled (that is, the case of the embodiments), respectively.

Note that FIG. 6 shows a result in a case where a cancellation method described in the second embodiment was used as a method for canceling the stray light signal component.

As is apparent from FIG. 6, according to the method for canceling the stray light signal component of the embodiments, in each of the cases where the light emission intensity (W) is Full, ⅔, and ⅓, the iMLSE was improved as compared to the case where the stray light was not canceled, which reveals that the playback performance is improved.

<4. Modifications>

Thus far, the embodiments according to the embodiment of the present technology have been described, but the present technology should not be limited to the above-described specific examples.

For example, although a case where the present technology is applied to a case where the recording (and the verify) are carried out by the ATS has been illustrated as an example, the present technology can widely and suitably be applied, aside from the case where the ATS is employed, to a case where the first light that serves as the recording light and the second light that is different from the first light are applied and, as stray light associated with the emission of the first light leaks into the second light when the second light is received, a stray light signal component is superimposed on a playback signal of the second light.

Further, in the description thus far, the stray light signal component is removed by inputting the recording signal Wrp (the recording pulse) that is outputted from the light strategy circuit 7, but a stray light cancellation signal for removing the stray light signal component can merely be generated based on the recording data and is not requested to be generated based on the recording signal Wrp.

Further, in the description thus far, a case where the equalization filter for carrying out the PR equalization processing on the RF signal side and the signal Sc side is an adaptive type equalization filter (the equalizer 40 and the adaptive type FIR filter 49) is illustrated as an example, but the equalization filter for the PR equalization is not requested to be an adaptive type equalization filter.

Further, in a case where processing of canceling the stray light signal component is carried out on the RF signal that is inputted to the PLL circuit as in the second embodiment as well, the adaptive type FIR filter 51 is not requested to be used as the equalization filter for carrying out the equalization processing on the signal Sc, and a non-adaptive type equalization filter can be used instead.

However, as illustrated in the embodiments, a filter that carries out adaptive equalization processing based on the maximum likelihood pass is more desirable in terms of improving playback performance.

Further, in the description thus far, a case where PRML method is employed as a method for obtaining the binary data array DD of the RF signal is illustrated as an example, but the present technology can be widely and suitably applied to case aside from the case where the PRML method is employed.

Further, a method for synchronizing timing of the RF signal is not limited to the ITR method, and the present technology can be widely and suitably applied to a case where a timing synchronization method other than the ITR method is employed.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) A recording device, including:

a light irradiation/receiving unit that irradiates an optical recording medium with first light which serves as recording light and with second light which is different from the first light and that receives backpropagating light of the second light from the optical recording medium;

a recording unit that carries out recording on the optical recording medium based on recording data by driving a light source of the first light to emit light;

a playback signal generating unit that obtains a playback signal of a signal which is recorded on the optical recording medium based on a light receiving signal of the second light; and a stray light signal component canceling unit that generates, based on recording data, a stray light cancel signal for canceling a stray light signal component which is superimposed on the playback signal by stray light associated with emission of the first light leaking into the second light when the second light is received, and that cancels the stray light signal component to be superimposed on the playback signal through the stray light cancel signal.

(2) The recording device according to (1),
wherein the stray light signal component canceling unit generates the stray light cancel signal based on a recording pulse signal obtained in the recording unit for driving the light source of the recording light to emit light.

(3) The recording device according to (2),
wherein the stray light signal component canceling unit generates the stray light cancel signal by smoothing a recording pulse signal.

(4) The recording device according to any one of (1) to (3), further including:
a phase locked loop (PLL) circuit for synchronizing a timing of the playback signal with a channel clock,
wherein the PLL circuit is configured to carry out PLL processing based on a signal in which the stray light signal component is canceled through the stray light cancel signal.

(5) The recording device according to any one of (1) to (4),
wherein the light irradiation/receiving unit irradiates the optical recording medium with the first light and the second light through a common objective lens.

(6) The recording device according to (5), further including:
an adjacent track servo control unit that generates a tracking error signal which is based on a light receiving signal of the second light and that controls a position of the objective lens in a manner that a beam spot of the second light follows a track which is recorded by the first light based on the tracking error signal.

(7) The recording device according to any one of (1) to (6),
wherein the playback signal generating unit includes a first equalization filter unit for partial response (PR) equalization and a Viterbi decoder that carries out Viterbi decoding processing on a signal on which equalization processing is carried out in the first equalization filter unit, the playback signal generating unit being configured to obtain a binary data array of the playback signal through a partial response maximum likelihood (PRML) method, and
wherein the stray light signal canceling unit includes a second equalization filter unit that carries out PR equalization processing on a signal which is based on the recording data and that cancels the stray light signal component by subtracting an output signal of the second equalization filter unit as the stray light cancel signal from an output signal of the first equalization filter unit.

(8) The recording device according to (7),
wherein the first equalization filter unit that is included in the playback signal generating unit and the second equalization filter unit that is included in the stray light signal component canceling unit are configured to carry out adaptive equalization processing that is based on a maximum likelihood pass which is obtained in the Viterbi decoder.

(9) The recording device according to any one of (4) to (8),
wherein the PLL circuit is configured as a PLL circuit of an interpolated timing recovery (ITR) method that includes a phase error detecting unit that carries out phase error detection of the playback signal and an interpolating unit that carries out interpolation of the playback signal based on an output of the phase error detecting unit, and
wherein the stray light signal component canceling unit cancels the stray light signal component of an input signal of the phase error detecting unit.

(10) The recording device according to (9),
wherein the playback signal generating unit includes a first equalization filter unit for partial response (PR) equalization and a Viterbi decoder that carries out Viterbi decoding processing on a signal on which equalization processing is carried out in the first equalization filter unit, the playback signal generating unit being configured to obtain a binary data array of the playback signal through a partial response maximum likelihood (PRML) method,
wherein the stray light signal component canceling unit includes a second equalization filter unit that carries out PR equalization processing on a signal that is based on the recording data and a third equalization filter unit that carries out equalization processing on a signal that is based on the recording data,
wherein at least the third equalization filter unit is configured to carry out adaptive equalization processing based on a maximum likelihood pass which is obtained in the Viterbi decoder, and
wherein the stray light signal component canceling unit cancels the stray light signal component of an input signal of the phase error detecting unit based on an output signal of the third equalization filter unit.

The present disclosure contains subject matter related to that disclosed in Japanese Priority Patent Application JP 2012-068843 filed in the Japan Patent Office on Mar. 26, 2012, the entire content of which is hereby incorporated by reference.

What is claimed is:
1. A recording device, comprising:
a light irradiation/receiving unit that irradiates an optical recording medium with first light which serves as recording light and with second light which is different from the first light and that receives backpropagating light of the second light from the optical recording medium;
a recording unit that carries out recording on the optical recording medium based on recording data by driving a light source of the first light to emit light;
a playback signal generating unit that obtains a playback signal of a signal which is recorded on the optical recording medium based on a light receiving signal of the second light; and
a stray light signal component canceling unit that generates, based on recording data, a stray light cancel signal for canceling a stray light signal component which is superimposed on the playback signal by stray light associated with emission of the first light leaking into the second light when the second light is received, and that cancels the stray light signal component superimposed on the playback signal through the stray light cancel signal.

2. The recording device according to claim 1,
wherein the stray light signal component canceling unit generates the stray light cancel signal based on a recording pulse signal obtained in the recording unit for driving the light source of the recording light to emit light.

3. The recording device according to claim 2,
wherein the stray light signal component canceling unit generates the stray light cancel signal by smoothing a recording pulse signal.

4. The recording device according to claim 1, further comprising:
a phase locked loop (PLL) circuit for synchronizing a timing of the playback signal with a channel clock,
wherein the PLL circuit is configured to carry out PLL processing based on a signal in which the stray light signal component is canceled through the stray light cancel signal.

5. The recording device according to claim 1,
wherein the light irradiation/receiving unit irradiates the optical recording medium with the first light and the second light through a common objective lens.

6. The recording device according to claim 5, further comprising:
an adjacent track servo control unit that generates a tracking error signal which is based on a light receiving signal of the second light and that controls a position of the objective lens in a manner that a beam spot of the second light follows a track which is recorded by the first light based on the tracking error signal.

7. The recording device according to claim 1,
wherein the playback signal generating unit includes a first equalization filter unit for partial response (PR) equalization and a Viterbi decoder that carries out Viterbi decoding processing on a signal on which equalization processing is carried out in the first equalization filter unit, the playback signal generating unit being configured to obtain a binary data array of the playback signal through a partial response maximum likelihood (PRML) method, and
wherein the stray light signal canceling unit includes a second equalization filter unit that carries out PR equalization processing on a signal which is based on the recording data and that cancels the stray light signal component by subtracting an output signal of the second equalization filter unit as the stray light cancel signal from an output signal of the first equalization filter unit.

8. The recording device according to claim 7,
wherein the first equalization filter unit that is included in the playback signal generating unit and the second equalization filter unit that is included in the stray light signal component canceling unit are configured to carry out adaptive equalization processing that is based on a maximum likelihood pass which is obtained in the Viterbi decoder.

9. The recording device according to claim 4,
wherein the PLL circuit is configured as a PLL circuit of an interpolated timing recovery (ITR) method that includes a phase error detecting unit that carries out phase error detection of the playback signal and an interpolating unit that carries out interpolation of the playback signal based on an output of the phase error detecting unit, and
wherein the stray light signal component canceling unit cancels the stray light signal component of an input signal of the phase error detecting unit.

10. The recording device according to claim 9,
wherein the playback signal generating unit includes a first equalization filter unit for partial response (PR) equalization and a Viterbi decoder that carries out Viterbi decoding processing on a signal on which equalization processing is carried out in the first equalization filter unit, the playback signal generating unit being configured to obtain a binary data array of the playback signal through a partial response maximum likelihood (PRML) method,
wherein the stray light signal component canceling unit includes a second equalization filter unit that carries out PR equalization processing on a signal that is based on the recording data and a third equalization filter unit that carries out equalization processing on a signal that is based on the recording data,
wherein at least the third equalization filter unit is configured to carry out adaptive equalization processing based on a maximum likelihood pass which is obtained in the Viterbi decoder, and
wherein the stray light signal component canceling unit cancels the stray light signal component of an input signal of the phase error detecting unit based on an output signal of the third equalization filter unit.

11. A method for canceling a stray light signal component, the method comprising:
a light irradiation/receiving procedure of irradiating an optical recording medium with first light that serves as recording light and with second light that is different from the first light, and receiving backpropagating light of the second light from the optical recording medium; and
a stray light signal component canceling procedure of generating, based on recording data, a stray light cancel signal for canceling a stray light signal component which is superimposed on a playback signal obtained based on a light receiving signal of the second light by stray light associated with emission of the first light leaking into the second light when the second light is received, and canceling the stray light signal component superimposed on the playback signal through the stray light cancel signal.

* * * * *